Jan. 20, 1953     L. C. BEARER     2,626,287
PEBBLE HEATER APPARATUS AND METHOD OF OPERATION
Filed Nov. 21, 1949
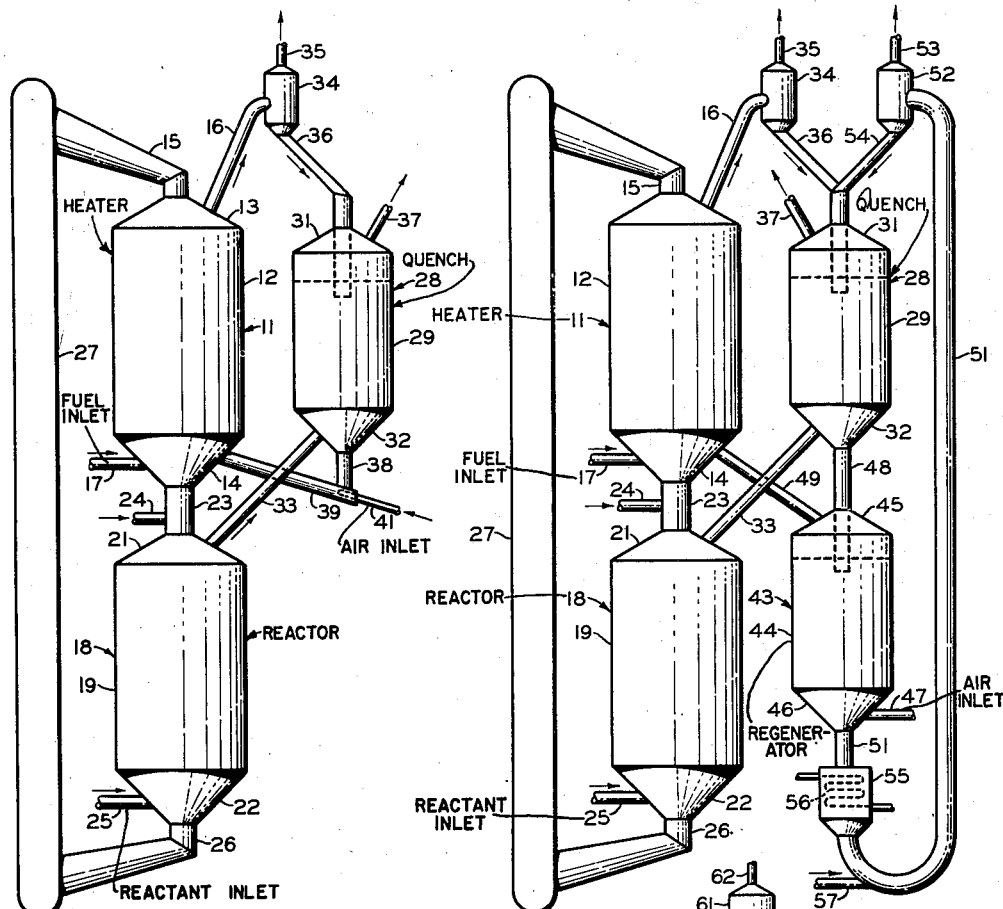
FIG. 1
FIG. 2
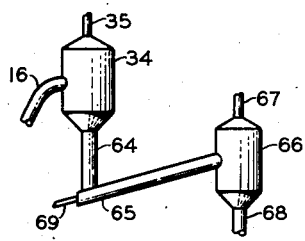
FIG. 4
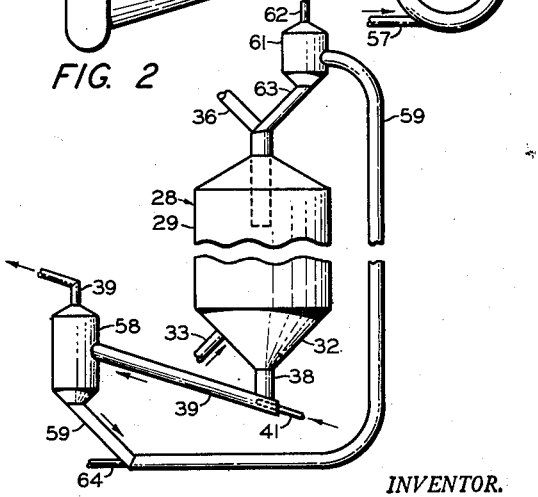
FIG. 3
INVENTOR.
L. C. BEARER
BY Hudson and Young
ATTORNEYS Patented Jan. 20, 1953

2,626,287

UNITED STATES PATENT OFFICE 2,626,287

PEBBLE HEATER APPARATUS AND METHOD OF OPERATION

Louis C. Bearer, Bartlesville, Okla., assignor to Phillips Petroleum Company, a corporation of Delaware Application November 21, 1949, Serial No. 128,602

8 Claims. (Cl. 260—677)

This invention relates to pebble heater apparatus. In one of its more specific aspects it relates to a fluidized solid material quench as a part of pebble heater apparatus. In another of its more specific aspects it relates to a method for removing tarry materials from reaction products of a hydrocarbon reaction. In another of its more specific aspects it relates to an improved reaction and quench system.

Thermal conversion processes which are carried out in so-called pebble heater apparatus utilize a fluent mass of solid heat exchange material which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous heat exchange material. The solid heat exchange material is heated to a high temperature in the heat exchanger and is then passed to a second chamber in which the hot solid heat exchange material is caused to contact the gaseous reactant materials in a second direct heat exchange relation, furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are passed upwardly through the cylindrical bed, sometimes being introduced thereinto at the periphery of the bed and at its lower end, and are sometimes introduced through a refractory arch which supports the moving pebble bed. At other times, heat is supplied to the heating chamber by supplying a fuel to the lower portion of the pebble bed within the heater chamber and burning the fuel in the presence of the pebbles so as to heat the pebbles with the heat of combustion and further heating the pebbles by passing the resulting combustion gas upwardly through the downflowing fluent mass of pebbles.

The heated pebbles are introduced into the upper portion of a reaction chamber and reactant materials are introduced into the lower portion of the reaction chamber and are caused to flow upwardly through the downflowing fluent hot pebble mass therein, thereby obtaining the heat required for thermal conversion of the reactant materials. Reaction products are removed from the upper portion of the reaction chamber generally at points above the top surface of the pebble bed. It is necessary to provide some type of quench system for many of the reactions which are carried on within pebble heater apparatus, such as in the manufacture of ethylene or acetylene. It is also quite desirable to additionally provide a method and apparatus for the removal of entrained liquid hydrocarbons or vaporized hydrocarbons that are liquid at temperatures in the neighborhood of 212° F. and above. Steam or water has conventionally been used in refinery operation for quenching such reaction products. One difficulty encountered with such a quench is that emulsions are formed when heavy oils or tarry materials simultaneously co-condense with water or steam which is used as the quench.

Broadly speaking, this invention comprises a means and method for reacting hydrocarbons and quenching the resulting reaction products. By this means and method tarry mists are removed from reaction products stream. The reaction products are quenched while passing through a relatively cool mass of fluidized particulate solid material. Heat carried by the reaction products is sufficient to convert the tarry material to coke on the particulate solid material. The coke-bearing particulate solid material is withdrawn from the quench chamber and is regenerated. The regenerated particulate solid material is then returned to the quench chamber.

Solid heat exchange material which is conventionally used in pebble heater apparatus is generally called "pebbles." The term pebbles as used herein denotes any solid refractory material of flowable size and form, having strength, which is suitable to carry large amounts of heat from the pebble heating chamber to the reaction chamber without rapid deterioration or substantial breaking. Pebbles conventionally used in pebble heater apparatus are substantially spherical in shape and range from about ⅛ inch to about 1 inch in diameter. In a high temperature process pebbles having a diameter of between about ⅛ inch and ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, thoria, beryllia, stellite, zirconia, and mullite may be satisfactorily used to form such pebbles or may be used in admixture with each other or with other materials. Pebbles formed of such materials, when properly fired, serve very well in high temperatures. Some pebbles, such as mullite-alumina pebbles, withstand temperatures well above 3000° F. Pebbles which are used may be either inert or catalytic, as used in any selected process. The particulate solid material which is utilized in the fluidized quench is preferably a material similar to that used in forming the pebbles used in the pebble heating and reaction chambers. The particulate solid material is, however, considerably smaller in size than the pebbles, preferably within the range of from 60 to 100 mesh, so as to facilitate fluidization of that material by the reaction product stream.

An object of this invention is to provide improved quench means for pebble heater apparatus. Another object of the invention is to provide an improved method for quenching reaction products formed in pebble heater apparatus. Another object of the invention is to provide an improved method for removing tarry material from reaction products. Another object of the invention is to provide an improved means and method for regenerating and cooling particulate solid quench materials. Other and further objects and advantages will be apparent to those skilled in the art upon study of the accompanying discussion and the drawings.

Understanding of the invention will be facilitated upon reference to the diagrammatic drawings in which Figure 1 is a schematic elevation of a pebble heater and quench apparatus of this invention. Figure 2 is a schematic elevation of a preferred modification of the pebble heater and quench apparatus of this invention. Figure 3 is a schematic elevation of a section of the quench chamber together with the regeneration and cooling means for the particulate solid quench materials. Figure 4 is an elevation of another modification of the connecting system between the upper portion of the pebble heater chamber and quench chamber of Figure 1.

Referring particularly to the device set forth in Figure 1 of the drawings, chamber 11 comprises upright shell 12 which is closed at its upper and lower ends by closure members 13 and 14, respectively. Pebble inlet conduit 15 and effluent outlet conduit 16 extend upwardly from closure member 13. Heating material inlet conduit 17 extends into the lower portion of chamber 11, preferably through closure member 14. Conduit 17 is in some cases, for the purpose of best heating material distribution, disposed so as to encircle at least a portion of closure member 14 and is connected to the interior of chamber 11 through closure member 14 at a plurality of points. Chamber 18 comprises upright shell 19 which is closed at its upper and lower ends by closure members 21 and 22, respectively. Pebble conduit 23 extends between closure member 14 of chamber 11 and closure member 21 of chamber 18. Sealing material inlet conduit 24 is connected to pebble conduit 23 intermediate its ends. Reactant material inlet conduit 25 is connected to the lower portion of chamber 18, preferably through closure member 22 and in many cases, for the purpose of reactant material distribution, encircles at least a portion of closure member 22 and is connected to the interior of chamber 11 through a plurality of points in closure member 22. Pebble outlet conduit 26 extends from closure member 22 of chamber 18 to the lower end portion of elevator 27. The upper end portion of elevator 27 is connected to the upper end of pebble inlet conduit 15.

Quench chamber 28 comprises upright shell 29 which is closed at its upper and lower ends by closure members 31 and 32, respectively. Effluent conduit 33 extends between the upper end portion of chamber 18 and the lower end portion of chamber 28. The upper end of effluent outlet conduit 16 from chamber 11 is connected to separation means, such as cyclone separator 34, at a point intermediate its ends. Effluent outlet conduit 35 is provided in the upper end of separator 34 and solid material conduit 36 extends downwardly from the lower end portion of separator 34 into the interior portion of chamber 28. Quenched product outlet conduit 37 extends upwardly from closure member 31 in chamber 28. Particulate solid material outlet conduit 38 extends downwardly from the lower end of chamber 28 and is connected to conduit 39 which extends between conduit 38 and the lower portion of chamber 11. Air inlet conduit 41 extends into conduit 39 at a point upstream of its connection with conduit 38.

In the operation of the device set forth as Figure 1 of the drawings, pebbles are supplied to chamber 11 through pebble inlet conduit 15 and form a flowing contiguous mass within that chamber. A fuel material, preferably in a gaseous state, is introduced into the lower portion of chamber 11 through conduit 17. Air is supplied to the lower portion of chamber 11 through conduits 41 and 39. The fuel is burned in the presence of the air and resulting combustion products flow upwardly through the downwardly flowing pebble mass and heat the pebbles within chamber 11 in a direct heat exchange relation. The heated pebbles gravitate through pebble conduit 23 into chamber 18 and form a hot flowing contiguous mass within that chamber. Reactant materials are introduced into the lower portion of chamber 18 through conduit 25. The reactant materials are vaporized in the lower portion of chamber 18, if they are not already in a vaporous or gaseous state, and flow upwardly through chamber 18 countercurrent to the flow of the downwardly flowing hot pebble mass. The hot pebbles provide the heat which is necessary to react the reactant materials. The pebbles are gravitated from the lower portion of chamber 18 through conduit 26 and are elevated by means of elevator 27 to the upper end portion of conduit 15 through which they pass to the upper end of chamber 11.

The reaction products resulting from the reaction within chamber 18 are passed from the upper end portion of that chamber through conduit 33 and are introduced into the lower portion of chamber 28 with sufficient velocity to substantially fluidize a mass of particulate solid material which is provided in a portion of that chamber. The top of the particulate solid material bed within chamber 28 is above the outlet end of conduit 36 within chamber 28. As the reaction products from chamber 18 contact the particulate solid materials within chamber 28 any tarry material or high boiling hydrocarbon material is deposited upon the surface of the particulate solid material and the weight of the tarry material is sufficient to cause the solid particulate material to settle to the bottom of chamber 28. The heat which is carried by the reaction products into the quench chamber is sufficient to convert the tarry material to carbon on the surface of the particulate solid material. Particulate solid material which settles out of the fluidized bed is removed from chamber 28 through conduit 38 and is entrained in the air stream in conduit 39 and is distributed thereby into the lower portion of chamber 11. The particulate solid material is entrained by the combustion products and any surplus air within chamber 11 and flows upwardly through that chamber countercurrent to the downflowing pebbles therein. The tarry or coked material is burned off of the surface of the particulate solid material within chamber 11 and the regenerated particulate solid material is carried by the entraining combustion products out of chamber 11 and into separator 34. The combustion products are separated from the particulate solid material and are vented from separator 34 through outlet conduit 35. The regenerated particulate solid material is returned to chamber 28 through conduit 36. The reaction products which are quenched in the fluidizing contact with the particulate solid material separate from that material in the upper end portion of chamber 28 and are removed from that chamber through outlet conduit 37.

Referring now to the device set forth in Figure 2 of the drawings, like parts are identified by like numerals. Upright chamber 43 comprises shell 44 which is closed at its upper and lower ends by closure members 45 and 46. Air inlet conduit 47 is connected to the lower portion of chamber 43, preferably through closure member 46. Particulate solid material conduit 48 extends downwardly from closure member 32 in chamber 28 into the interior of chamber 43. Effluent conduit 49 extends between the upper end portion of chamber 43 and the lower end portion of chamber 11. Particulate solid material conduit 51 extends between closure member 46 of chamber 43 and separator 52 which is provided above the level of chamber 28. Effluent outlet conduit 53 is provided in the upper end portion of separator 52 and conduit 54 extends between the lower end portion of separator 52 and conduit 36 which extends downwardly into chamber 28. Cooler 55 is provided intermediate the ends of conduit 51, preferably near its inlet end and is provided with cooling coils 56. Gaseous material inlet conduit 57 is provided intermediate the ends of conduit 51 also near the inlet end of that conduit, but preferably downstream of cooler 55.

The pebbles are heated and reactant materials are reacted in the device of Figure 2 in the same manner as that described in connection with the device of Figure 1 of the drawings. The method of operation of Figure 1 is modified in the device of Figure 2 by providing a regeneration chamber which is separate from the pebble heating chamber 11. The particulate solid material, upon which tarry materials have settled and have been reduced to coke, gravitate through conduit 48 into chamber 43. Air is introduced into the lower portion of chamber 43 through conduit 47 at such a velocity as to partially fluidize the particulate solid material within that chamber. The coke material is oxidized by the oxygen introduced into chamber 43 and is thus removed from the particulate solid material as oxides of carbon. Air which is preheated in chamber 43, together with the carbon oxides, is separated from the particulate solid material in the upper portion of chamber 43 and passes by means of conduit 49 into the lower portion of chamber 11 where the preheated air is used to support the combustion of fuel introduced into the lower portion of that chamber through conduit 17. As regenerated particulate solid material settles within chamber 43, it is withdrawn through conduit 51 and is passed through cooler 55 in which the particulate solid material is cooled. That material is then entrained in a gaseous steam, such as air, and is elevated to separator 52 in which the air or entraining fluid is separated from the particulate solid material. The entraining fluid is vented through conduit 53 and the cooled regenerated particulate solid material gravitates through conduit 54 and conduit 36 into chamber 28. Any particulate solid material which is not separated from the air and carbon oxides before those gases leave the upper portion of chamber 43 are carried by those gases and by the combustion gases within chamber 11 upwardly through that chamber and through conduit 16 into separator 34. The particulate solid material is separated from the gaseous material which is vented through outlet conduit 35 and the solid material is returned to chamber 28 through conduit 36. The quenched reaction products are removed from chamber 28 through outlet conduit 37. The device of Figure 2 may be modified by eliminating cooler 55 and allowing the entraining gas to cool the regenerated material.

The device shown and described as Figure 1 of the drawings is under some conditions modified as set forth in Figure 3 of the drawings. Separator 58 is disposed in conduit 39 which extends between outlet conduit 38 and the lower portion of chamber 11. Conduit 59 extends between the lower end portion of separator 58 and a point intermediate the ends of separator 61 which is disposed above chamber 28. Effluent outlet conduit 62 is provided in the upper end portion of separator 61 and conduit 63 extends from the lower end portion of separator 61 to conduit 36 which extends into the interior of chamber 28. Gaseous material inlet conduit 64 extends into conduit 59 at a point intermediate its ends but preferably at a point near the inlet end of that conduit.

The operation of the device shown in Figure 1 of the drawings is modified when the modification of Figure 3 is applied to that device. This device is used, however, only when little if any tarry material is present in the reaction products. The particulate solid material which settles from the chamber 28 is entrained in an air stream as disclosed in the discussion of the device shown in Figure 1 of the drawings. The section of conduit 39 which extends between conduit 38 and separator 58 is of such length as to provide sufficient contact time between particulate solid material bearing any coke material and the entraining air stream to allow the coke material to be oxidized and removed from the solid material. The solid material which is regenerated in that manner is separated from the oxides of carbon which result in the regeneration and the air which is preheated by the solid contact material, in separator 58. The preheated air, together with the other gaseous materials, is passed by means of conduit 39 into the lower portion of chamber 11 and the regenerated solid material is gravitated into conduit 59 in which it is entrained by a gaseous material, such as air, and is elevated to separator 61 in which the solid material is separated from the gaseous material which is vented through outlet conduit 62. The regenerated particulate solid material is cooled by the entraining gas and in that cool state is introduced into the upper portion of quench chamber 28 through conduits 63 and 36.

The device of Figure 1 is further modified at times by the addition of a cooling system between the upper ends of chamber 11 and chamber 28, as shown in Figure 4. Conduit 64 extends downwardly from the lower end portion of separator 34 and is connected to conduit 65 which in turn is connected at one end to a point intermediate the ends of separator 66. Effluent outlet conduit 67 is provided in the upper end portion of separator 66 and solid material conduit 68 extends downwardly from the bottom portion of separator 66 into the interior of chamber 28. Cooling gas inlet conduit 69 extends into conduit 65, preferably at a point upstream of the connection between conduits 64 and 65.

The operation of the device of Figure 1 is modified when the device of Figure 4 is provided as a modification of that apparatus. The combustion products carrying the regenerated particulate solid material from chamber 11 are separated from that solid material in separator 34 and are vented therefrom through conduit 35. The regenerated particulate solid material is gravitated through conduit 64 into conduit 65 in which the solid material is entrained by a stream of cooling gas which carries the particulate solid material into separator 66 in which the cooling gas is separated from the particulate solid material and is vented through outlet conduit 67. The cooled and regenerated solid material is gravitated through conduit 68 into the interior of chamber 28.

The method and means disclosed above make possible the very rapid quench of reaction products by the presentation of a great amount of surface area of cooled solid material in a fluidized solid quench bed. The formation of emulsions during the quenching step is completely prevented by means of this invention. The great surface area of the quench material also makes possible the separation of tars, coke, and the like. Various modifications and advantages will be apparent to those skilled in the art upon study of the accompanying discussion and the drawings. Such modifications can be made without departing from the spirit and the scope of this disclosure.

I claim:

1. A method for reacting and quenching hydrocarbons which comprises in combination the steps of passing pebbles into the upper portion of a pebble heating zone; passing fuel and air into the lower portion of said pebble heating zone; burning said fuel in direct heat exchange with said pebbles; removing resulting combustion products from the upper portion of said pebble heating zone; passing said heated pebbles into the upper portion of a reaction zone and downwardly therethrough; introducing reactant material into the lower portion of said reaction zone; passing said pebbles from said reaction zone to said pebble heating zone; passing cool particulate solid material into the upper portion of a quenching zone; removing resulting reaction products from said reaction zone; introducing said reaction products into the lower portion of said quenching zone at a rate sufficient to fluidize said particulate solid material therein, whereby said reaction products are quenched and any tarry materials entrained therein are deposited on said particulate solid material; converting said tarry materials to coke by the action of the heat of said reaction products; removing quenched reaction products from said quenching zone; removing coke bearing particulate solid material from said quenching zone; entraining said coke bearing particulate solid material in an air stream, whereby said air is preheated; introducing said preheated air and particulate solid material into the lower portion of said pebble heating zone; passing said particulate material through said pebble heating zone countercurrent to the flow of pebbles therethrough, whereby said particulate solid material is regenerated in said pebble heating zone; removing said regenerated particulate solid material from said pebble heating zone with said combustion products; separating said combustion products and said particulate solid material; and introducing said regenerated particulate solid material into said quenching zone.

2. A method for reacting and quenching hydrocarbons which comprises in combination the steps of passing pebbles into the upper portion of a pebble heating zone; passing fuel and air into the lower portion of said pebble heating zone; burning said fuel in direct heat exchange with said pebbles; removing resulting combustion products from the upper portion of said pebble heating zone; passing said heated pebbles into the upper portion of a reaction zone and downwardly therethrough; introducing reactant material into the lower portion of said reaction zone; passing said pebbles from said reaction zone to said pebble heating zone; passing cool particulate solid material into the upper portion of a quenching zone; removing resulting reaction products from said reaction zone; introducing said reaction products into the lower portion of said quenching zone at a rate sufficient to fluidize said particulate solid material therein, whereby said reaction products are quenched and any tarry materials entrained therein are deposited on said particulate solid material; converting said tarry materials to coke by the action of the heat of said reaction products; removing quenched reaction products from said quenching zone; removing coke bearing particulate solid material from said quenching zone; entraining said coke bearing particulate solid material in an air stream in which at least a portion of said coke is oxidized and said particulate solid material is regenerated, whereby said air is preheated; separating said regenerated particulate solid material from a portion of said preheated air; introducing said preheated air and a portion of said particulate material into the lower portion of said pebble heating zone; entraining said separated regenerated particulate solid material in a cool gas, whereby said particulate solid material is cooled; separating said cooled particulate solid material and said gas; separating regenerated particulate material from said combustion products from said pebble heating zone; and introducing said cooled portions of said particulate solid material into said quenching zone.

3. The method of claim 1, wherein said regenerated particulate solid material is cooled before its introduction into said quenching zone.

4. An improved pebble heater and quench apparatus comprising in combination a first closed upright shell; a pebble inlet in the upper end portion of said first shell; a fuel inlet in the lower end of said first shell; first effluent means in the upper end portion of said first shell; a second closed upright shell below said first shell; a first pebble conduit extending between the lower end of said first shell and the upper end of said second shell; an elevator; a second pebble conduit extending between the lower end of said second shell and the lower end portion of said elevator; a third pebble conduit extending between the upper end portion of said elevator and said pebble inlet in said first shell; a reactant material inlet in the lower end portion of said second shell; a third closed upright shell; a first solid material inlet communicating with said first effluent means and extending downwardly into said third shell; second effluent means in the upper end portion of said third shell; a gaseous material conduit extending between the upper end portion of said second shell and the lower end portion of said third shell; solid material outlet means in the lower end portion of said third shell; a first fluid conduit connected to said solid material outlet means in said third shell and extending to the lower portion of said first shell; and a fluid inlet conduit connected to the upstream end of said first fluid conduit.

5. An improved pebble heater and quench apparatus comprising in combination a first closed upright shell; a pebble inlet in the upper end portion of said first shell; a fuel inlet in the lower end of said first shell; a second closed upright shell below said first shell; a first pebble conduit extending between the lower end of said first shell and the upper end of said second shell; an elevator; a second pebble conduit extending between the lower end of said second shell and the lower end portion of said elevator; a third pebble conduit extending between the upper end portion of said elevator and said pebble inlet in said first shell; a reactant material inlet in the lower end portion of said second shell; a third closed upright shell; a first solid material inlet extending downwardly into the upper end portion of said third shell; a gaseous material conduit extending between the upper end portion of said second shell and the lower end portion of said third shell; a first fluid-solid separator; a first effluent conduit extending between the upper end portion of said first shell and a point intermediate the ends of said first separator; a second effluent outlet in the upper end portion of said first separator; a first solid material conduit extending between the lower end portion of said first separator and said solid material inlet in said third shell; second effluent means in the upper end portion of said third shell; a solid material outlet in the lower end portion of said third shell; a first fluid conduit connected to said solid material outlet in said third shell and extending to the lower portion of said first shell; and a fluid inlet conduit connected to the upstream end of said first fluid conduit.

6. The improved pebble heater and quench apparatus of claim 5, wherein a second fluid-solid separator is disposed in said first fluid conduit; a third fluid-solid separator; a second solid material conduit extending between the lower end portion of said second separator and a point intermediate the ends of said third separator; a gaseous material inlet in the inlet end portion of said second solid material conduit; a third effluent outlet conduit in the upper end portion of said third separator; and a third solid material conduit extending between the lower end of said third separator and said solid material inlet in the upper end of said third shell.

7. The improved pebble heater and quench apparatus of claim 5, wherein a fourth upright shell is disposed below said third shell; a second solid material inlet extends downwardly into the upper end of said fourth shell; said solid material outlet in the lower end portion of said third shell is connected to said second solid material inlet in said fourth shell; a gaseous material inlet in the lower portion of said fourth shell; said first fluid conduit extending between the upper end portion of said fourth shell and the lower end portion of said first shell; a second fluid-solid separator above said third shell; a second solid material conduit extending between the lower end portion of said fourth shell and a point intermediate the ends of said second separator; an effluent outlet in the upper end of said second separator; a third solid material conduit extending between the lower end of said second separator and said solid material inlet in said third shell; and a gaseous material inlet in the inlet end portion of said second solid material conduit.

8. The improved pebble heater and quench apparatus of claim 7, wherein a cooling chamber is disposed intermediate the ends of said second solid material conduit.

LOUIS C. BEARER.

REFERENCES CITED

The following references are of record in the file of this patent:

UNITED STATES PATENTS

| Number | Name | Date |
|---|---|---|
| 2,432,962 | Bergstrom | Dec. 16, 1947 |
| 2,436,254 | Eastwood et al. | Feb. 17, 1948 |
| 2,443,210 | Upham | June 15, 1948 |
| 2,444,650 | Johnson et al. | July 6, 1948 |
| 2,466,005 | Crowley | Apr. 5, 1949 |
| 2,479,496 | Keith | Aug. 16, 1949 |
| 2,538,219 | Welty | Jan. 16, 1951 |
| 2,554,407 | Hepp | May 22, 1951 |
| 2,555,210 | Waddill et al. | May 29, 1951 |